United States Patent [19]

Kamiya et al.

[11] 4,199,490

[45] Apr. 22, 1980

[54] BLOCK COPOLYMER LATEX COMPOSITION

[75] Inventors: Shunji Kamiya; Kunio Satake; Tomiho Sone, all of Yokohama; Tsutomu Teraoka, Kanagawa, all of Japan

[73] Assignee: Asahi Kasei Kogyo Kabushiki Kaisha, Tokyo, Japan

[21] Appl. No.: 769,102

[22] Filed: Feb. 16, 1977

Related U.S. Application Data

[63] Continuation of Ser. No. 574,968, May 6, 1975, abandoned.

[30] Foreign Application Priority Data

| May 7, 1974 | [JP] | Japan | 49-50416 |
| Jul. 3, 1974 | [JP] | Japan | 49-76028 |
| Dec. 2, 1974 | [JP] | Japan | 49-138197 |
| Dec. 2, 1974 | [JP] | Japan | 49-138198 |
| Dec. 4, 1974 | [JP] | Japan | 49-138529 |

[51] Int. Cl.$^2$ ............................................. C08L 53/00
[52] U.S. Cl. ..................... 260/29.7 D; 260/29.7 NR; 260/29.7 W; 260/29.7 H; 260/29.7 T; 260/29.7 EM; 260/29.7 PT; 260/5; 525/95; 525/96; 525/98; 525/99
[58] Field of Search ................. 260/29.7 D, 29.7 WR, 260/29.7 W

[56] References Cited

U.S. PATENT DOCUMENTS

| 3,265,765 | 8/1966 | Holden et al. | 260/876 |
| 3,293,197 | 12/1966 | Vincent et al. | 260/29.7 D X |
| 3,304,281 | 2/1967 | Tucker | 260/29.7 D X |
| 3,458,602 | 12/1962 | Pollock | 260/880 |
| 3,539,475 | 11/1970 | Yoshioka et al. | 260/29.7 D X |
| 3,700,757 | 10/1972 | LaHeij et al. | 260/29.7 D X |
| 3,878,153 | 4/1975 | Driscoll | 260/29.7 D |

FOREIGN PATENT DOCUMENTS

644022 10/1950 United Kingdom ............... 260/29.7 D

OTHER PUBLICATIONS

Blackley, High Polymer Latices, I, (Applied Science 1966), pp. 265-266.

*Primary Examiner*—Paul Lieberman
*Attorney, Agent, or Firm*—Armstrong, Nakaido, Marmelstein & Kubovcik

[57] ABSTRACT

A block copolymer latex composition comprising (A) an aqueous latex containing at least one of block copolymers consisting of conjugated diolefin blocks and monovinyl-substituted aromatic compound blocks prepared by solution-polymerization, and having a molecular weight of 5,000 to 500,000 and a content of monovinyl-substituted aromatic compound of 10 to 70% by weight, and (B) a latex of rubber system, latex of synthetic resin system or a mixture thereof, the composition containing 5 to 87% by weight of (A) and 95 to 13% by weight of (B) in terms of solid matters, has very superior film-forming properties and provides films having improved strength.

7 Claims, No Drawings

BLOCK COPOLYMER LATEX COMPOSITION

This is a continuation, of application Ser. No. 574,968, filed May 6, 1975 now abandoned.

DESCRIPTION OF THE INVENTION

This invention relates to an improvement in a film-forming property of block copolymer latex consisting of conjugated diolefin and monovinyl-substituted aromatic compound, and also relates to an improvement in a film strength of latex of rubber system, latex of synthetic resin system or their mixture.

As the latex of synthetic rubber system such as latex of styrene-butadiene copolymers, the latex prepared by emulsion polymerization is usually used for practical purposes, but as a result of recent rapid development in polymerization technique, many kinds of synthetic rubber of solution-polymerization type having various features have been prepared and have been tried to be used as latex.

According to an ordinary process for preparing a latex from such synthetic rubber of solution-polymerization type, an emulsifying agent and water are added to a polymerization solution of rubber or a solution of solid rubber dissolved in an appropriate solvent to emulsify the solution, and then the solvent is removed from the resulting emulsion by stripping or flashing or the like. The resulting latex is the so-called diluted latex, and can be utilized as such, but it can be concentrated, if necessary, by creaming, centrifugal separation or other operation.

As one of synthetic rubbers having the features, obtained by solution-polymerization, there are available alternating block copolymers consisting of (A) monovinyl-substituted aromatic compound blocks and (B) conjugated diolefin polymer blocks, represented by the following general formulae:

A - B - A, or (A - B)$_n$, or

B—(A - B)$_n$, or (A - B—)$_n$A, or (A - B)$_m$X wherein A represents a block consisting substantially of monovinyl-substituted aromatic compound polymers, B blocks consisting substantially of conjugated diolefin polymers, n an integer of 2 to 10, m an integer of 3 to 7, and X an residue derived from a multi-functional compound in which m polymer chains A-B are combined with each other. These alternating block copolymers are called "thermoplastic elastomer", and show a high strength, high degree of elongation and a low residual strain characteristic, which are equivalent to those of the ordinary vulcanized rubber, in such a state that the cross-linking treatment, which is usually carried out with a sulfur compound, etc., is not conducted. An aqueous latex of such block copolymer is useful as an immersion molding product, cast molding product, foam rubber, rubber threads, paper processing agent, carpet sizing agent, fiber processing agent, surface coating agent, adhesive, pressure-sensitive adhesive, paint binder, non-woven fabric binder, latex-added asphalt, cement additive, etc. when its peculiar characteristics are utilized. However, the aqueous latex of such block copolymer has a high minimum film-forming temperature, which will be hereinafter referred to as MFT, and thus has such a disadvantage that a film cannot be formed under the natural conditions. MFT used herein is a film-forming temperature measured according to the temperature gradient plate method proposed by Thomas F. Protzman (Journal of Applied Polymer Science, Vol. 4, pages 81–85).

For the improvement of film-forming property, there have been so far utilized an internal plasticization method, an external plasticization method, a tentative plasticization method, etc. The internal plasticization method is a method for copolymerization with a soft component monomer (the monomer capable of forming homopolymers having a low glass transition temperature, but it is not appropriate as a method for improving the film-forming property of latex obtained by emulsifying the block copolymer prepared by solution-polymerization. The external plasticization method is the one based on the use of a plasticizer, which is added at or after the preparation of latex. When the plasticizer is added at the preparation of latex, the block copolymer shows a softening phenomenon due to the plasticization effect in the step of preparing the latex, and emulsification is attained insufficiently. As a result, only an emulsion of relatively large particle sized is obtained, and the emulsified particles are liable to undergo recoagulation. Thus, there are problems in the stabilization of latex. When a plasticizer is added after the preparation of latex, the plasticizer must be emulsified and dispersed in water, and then must be absorbed into the particles of block copolymer while dispersing the plasticizer through water. A sufficient plasticization is necessary for forming a homogeneous latex film at a low temperature. That is, a long period of time and a large amount of the plasticizer are necessarily required. Especially, use of a large amount of plasticizer considerably lowers the mechanical properties of latex film, and thus is not preferable. The tentative plasticization method is the one based on the use of a tentative plasticizer which plays a role of plasticizer only in the formation of film to promote the film formation, and evaporates off as rapid as possible after the formation of the film to improve the mechanical properties of the film. However, the tentative plasticizer is expensive, and at the same time a large amount of an organic solvent must be used. Thus, there are pending problems in safety and sanitation of workers, fire, air pollution, etc.

Latex of rubber system or synthetic resin system is used in a wide range of applications such as an immersion molding product, cast molding product, foam rubber, rubber threads, paper processing agent, carpet sizing agent, fiber processing agent, surface coating agent, adhesive, pressure-sensitive adhesive, paint binder, non-woven fabric binder, latex-added asphalt, cement additive, etc. However, in order to obtain latex of rubber system having a good strength characteristic, there is such a disadvantage that the latex must be subjected to cross-linking treatment with a sulfur compound, metal oxide, peroxide, or the like. In order to obtain latex of synthetic resin system having a good strength characteristic, the latex must be copolymerized with a special monomer of self-cross-linking type or must be cross-linked by means of a cross-linking agent. A film obtained from the cross-linked latex of synthetic resin system usually has a high tensile strength, but has such a disadvantage as a low elongation.

As a result of various studies on an improvement of film-forming property of latex of block copolymer consisting of conjugated diolefin and monovinyl-substituted aromatic compound, and also on an improvement of a strength characteristic of latex of rubber system, latex of synthetic resin system or a mixture thereof, the present inventors have found that the film-forming property and strength characteristics, which have been so far disadvantages of these respective latexes, can be remarkably improved by mixing the latex of block copolymer with the latex of rubber system, or latex of synthetic resin system or a mixture thereof, and have established the present invention.

The present invention resides in a block copolymer latex composition comprising (A) an aqueous latex containing at least one of block copolymers consisting of conjugated diolefin blocks and monovinyl-substituted aromatic compound blocks prepared by solution-polymerization, and having a molecular weight of 5,000 to 500,000 and a content of monovinyl-substituted aromatic compound of 10 to 70% by weight, and (B) a latex of rubber system, latex of synthetic resin system or a mixture thereof, the composition containing 5 to 87% by weight of (A) and 95 to 13% by weight of (B) in terms of solid matters.

The block copolymers used in the present invention are represented by the general formulae: A - B - A, (A - B)$_n$, B—(A - B)$_n$, (A - B)$_{\overline{n}}$A or (A - B)$_m$X, where A, B, X, n and m have the same meanings as defined above, and can be polymerized by living anion polymerization with an initiator on the basis of an alkali metal. The monovinyl-substituted aromatic compound includes styrene, o- or p-vinyltoluene, vinylxylene, ethylstyrene, isopropylstyrene, ethylvinyltoluene, tert-butylstyrene, diethylstyrene, vinylnaphthalene, etc., and can be used in a combination of these two or more. The conjugated diolefin includes 1,3-butadiene, 1,3-pentadiene, isoprene, 2,3-dimethylbutadiene, etc. and can be used in a combination of these two or more. Preferable combinations are that of 1,3-butadiene with styrene and that of isoprene with styrene. Such block copolymers can be obtained by successive polymerizations of monomers into the individual blocks in the presence of said initiator, or by simultaneous introduction and polymerization of at least two kinds of monomers having different copolymerization reactivity ratios, or by coupling living block copolymers by said initiator. The block copolymer represented by said (A - B)$_m$X can be obtained by coupling living block copolymers of A - B$^\ominus$ by a multifunctional coupling agent. For example, such a tetrafunctional coupling agent as silicon tetrachloride can be used. Molecular weight of the block copolymer is 5,000 to 500,000. If the molecular weight is less than 5,000, the film obtained from the latex has a poor mechanical strength. If the molecular weight exceeds 500,000, a viscosity of solution will be higher at the emulsification, and consequently the emulsification becomes incomplete or difficult. The properties of the resulting latex are given unfavorable influences. It is necessary to select the content of monovinyl-substituted aromatic compound polymer block in the block copolymer in a range of 10 to 70% by weight on the basis of the total polymers. If the content is outside said range, a feature as a thermoplastic elastomer cannot be fully established.

One embodiment of a process for producing a latex of block copolymers is given below.

A polymerization product solution can be used as it is, as a polymer solution for producing the latex of block copolymer, or solid state rubber of the block copolymer may be dissolved in a solvent such as benzene, toluene, xylene, cyclohexane, cyclooctane, chloroform, carbon tetrachloride, trichlene, methane dichloride, etc. It is preferable to use the polymer solution usually at a concentration of 5 to 50% by weight.

Non-ionic, anionic or cationic emulsifying agents are used for producing the latex of block copolymers, and their amount to be used is not restricted, but it is preferable to use 0.1 to 15 parts by weight of the emulsifying agent per 100 parts by weight of the block copolymer. As the anionic emulsifying agent, at least one of higher fatty acid salts, rosin acid salts, disproportionated rosin acid salts, sulfuric acid ester salts of higher alcohol, sulfuric acid ester salts of polyethylene glycol ether, amide-bonded (or ester-bonded) sulfuric acid ester salts, amide-bonded (or ether-bonded) sulfonates, alkylaryl sulfonates, ether-bonded (or ester-bonded or amide-bonded) alkylaryl sulfonates, and formalin-condensed naphthalene sulfonates, but the anionic emulsifying agents are not restricted thereto. Examples of the anionic emulsifying agents include potassium oleate, sodium laurate, sodium rosinate, disproportionated potassium rosinate, sodium dodecylbenzene sulfonate, triethanolaminedodecylbenzene sulfonic acid salt, sodium salt of sulfuric acid ester of lauryl alcohol, ammonium mononaphthalene sulfonate, sodium oleoylmethyltaurate, sodium dioctylsulfosuccinate, sodium dodecyldiphenylether disulfonate, etc. When said emulsifying agent is used, it can be directly dissolved in water. Alternatively a higher fatty acid, rosin acid, disproportionated rosin acid, dodecylbenzene sulfonic acid or the like is dissolved in the solution of the block copolymer and an aqueous alkali solution (for example, an aqueous solution of sodium hydroxide, etc.) is used as a dispersing medium to form salts of higher fatty acid, salts of rosin acid, salts of disproportionated rosin acid, salts of dodecylbenzenesulfonic acid or the like, when the aqueous solution is mixed with the solution of the block copolymer.

As the non-ionic emulsifying agent, at least one of the compounds represented by the following general formulae:

R$_1$(O - R$_2$)$_{\overline{n}'}$ OH or

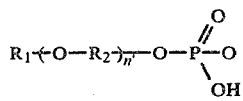

wherein R$_1$ is an alkyl group having 8 to 18 carbon atoms or alkylphenyl group having an alkyl group of 8 to 12 carbon atoms; R$_2$ an alkylene group having 2 to 5 carbon atoms; n' an integer of 3 to 50, is used.

Examples of the non-ionic emulsifying agent include polyoxyethylene nonylphenyl ether, polyoxyethylene lauryl ether, polyoxyethylene nonylphenyl ether phosphoric acid ester, polyoxyethylenepropylene nonylphenyl ether phosphoric acid ester, etc. Furthermore, other non-ionic emulsifying agents than those represented by said general formula, for example, sorbitan ester type (sorbitan monopalmitate, sorbitan monostearate, etc.), sorbitan ester ether type (polyoxyethylene sorbitan monostearate, etc.), oxyethylene oxypropylene block copolymer, etc. can be used, but the non-ionic emulsifying agent is not restricted thereto. These non-ionic emulsifying agent can be used together with said anionic emulsifying agent to prevent deposition and coagulation of latex particles at the emulsification, solvent removal or concentration when the latex is produced by means of said anionic emulsifying agent, or further improve the mechanical stability of the latex thus produced.

As the cationic emulsifying agent, at least one of aliphatic amine salts, quaternary ammonium salts, alkylpyridinium salts, or the like is used, but the cationic emulsifying agent is not restricted thereto.

Examples of the cationic emulsifying agents include octadecyltrimethylammonium chloride, alkyldimethylbenzylammonium chloride, polyoxyethylene alkylamine, octadecylamine acetate, alkylisoquinolium bromide, etc. These cationic emulsifying agents can be used together with the non-ionic emulsifying agent without any trouble. Particularly preferable emulsifying agent is a combination of the higher fatty acid salt, a rosin acid salt or disproportionated rosin acid with the non-ionic emulsifying agent represented by said general formula.

In the present invention, any well known emulsifier can be used, so long as it has a sufficiently powerful emulsifying ability. For example, a homomixer, homogenizer, dispermill, colloid mill, etc. are available. Two kinds of the emulsifiers can be used in combination, if required.

Then, the solvent is removed from the emulsified solution to obtain a dilute latex by the well known art of removing the solvent, for example, by distillation based on a jacket heating, or by steam distillation based on direct injection of steam into the emulsified solution.

The dilute latex thus obtained usually has a concentration of solid matters of 5 to 50% by weight. The dilute latex can be further concentrated to a higher concentration of solid matters by creaming, centrifugal separation or water evaporation. Particularly, the concentration by centrifuge is effective, and preferable because of its good reproducibility.

Examples of latex of rubber system used in the present invention include natural rubber latex, styrene-butadiene copolymer latex, methyl methacrylate-butadiene copolymer latex, acrylonitrile-butadiene copolymer latex, isoprene-isobutylene copolymer latex, styrene-butadiene-vinylpyridine copolymer latex, ethylene-propylene copolymer latex, ethylene-propylene-diene copolymer latex, chloroprene polymer latex, butadiene polymer latex, isoprene polymer latex, etc. These latices can be modified with carboxyl group, hydroxyl group, etc.

Examples of latex of synthetic resin system used in the present invention include latices of acrylic acid ester system, for example, acrylic acid ester polymer latices such as methyl acrylate polymer latex, ethyl acrylate polymer latex, butyl acrylate polymer latex, 2-ethylhexyl acrylate polymer latex, etc., or copolymer latices of mutual acrylic acid esters such as ethyl acrylate-butyl acrylate copolymer latex, butyl acrylate-2-ethylhexyl acrylate copolymer latex, etc. or copolymer latices of acrylic acid ester with at least one of copolymerizable monomers, such as acrylic acid ester-vinyl acetate copolymer latex, acrylic acid ester-styrene copolymer latex, acrylic acid ester-methyl methacrylate copolymer latex, etc.; latices of vinyl acetate system, for example, vinyl acetate polymer latex, and copolymer latices of vinyl acetate with at least one of copolymerizable monomers such as vinyl acetate-ethylene copolymer latex, vinyl acetate-ethylene-acrylic acid copolymer latex, vinyl acetate-acrylic acid copolymer latex, vinyl acetate-maleic anhydride copolymer latex, vinyl acetate-maleic anhydride copolymer latex, vinyl acetate-maleic acid ester copolymer latex, vinyl acetate-veova copolymer latex, vinyl acetate-vinyl chloride copolymer latex, vinyl acetate-vinyl chloride-acrylic acid copolymer latex, etc.; vinyl chloride polymer latex; vinylidene chloride polymer latex; vinyl chloride-vinylidene chloride copolymer latex; urethane polymer latex; polyamide latex; polyester latex, etc.

A mixing ratio of (A) latex of block copolymer to (B) latex of rubber system, or latex of synthetic resin system or a mixture thereof is selected from a range of (A):(B) being 5–87% by weight: 95–13% by weight in terms of solid matters.

When an improvement of the film-forming property of the latex of block copolymer is desired, a preferable range for the mixing ratio of (A) latex of block copolymer to (B) latex of rubber system or latex of synthetic resin system or a mixture thereof is (A):(B) being 63–83% by weight: 37–17% by weight in terms of solid matters. When an improvement of the strength characteristics of latex of rubber system, or latex of synthetic resin system, or a mixture thereof is desired, a preferable range for the mixing ratio of (A) latex of block copolymer to (B) latex of rubber system, latex of synthetic resin system or a mixture thereof is (A):(B) being 10–65% by weight: 90–35% by weight, more preferably 10–50% by weight: 90–50% by weight, in the terms of solid matters. The reasons for the restriction to said range are that, when the amount of the latex of block copolymer is less than 5% by weight, the effect upon the improvement of strength characteristics of the latex of rubber system, or latex of synthetic resin system or a mixture thereof is poor, and when it exceeds 87% by weight, the effect upon the improvement of film-forming properties of the latex of block copolymer by the addition of the latex of rubber system, latex of synthetic resin system or a mixture thereof is poor.

In the block copolymer latex composition of the present invention, the latex of block copolymer having the improved film-forming properties is applicable to the uses where the latex of rubber system, latex of synthetic resin system or a mixture thereof is employed, and is useful particularly as an adhesive, fiber-processing agent, non-woven fabric, or carpet sizing agent. Furthermore, the latex of rubber system, latex of synthetic resin system or a mixture thereof having the improved strength characteristics can be used in the applications where various latices are employed so far, with a better effect, and is useful particularly as a carpet sizing agent and fiber-processing agent, capable of providing an improved tensile strength and elongation, an adhesive having an improved bonding strength, and an adhesive for adhesive tape having an improved peeling strength and anti-creep property.

The block copolymer latex composition of the present invention can contain an ordinarily applicable amount of antiseptics, plasticizer, defoaming agent, thickener, anti-freeze agent, tackifier, filler, foaming agent or other materials, depending upon their uses.

Now, the present invention will be described in detail, referring to Examples, but Examples will not be limitative of the scope of the present invention.

EXAMPLE 1

To a 15 wt.% n-hexane solution containing 41 g of a monomer mixture of 1,3-butadiene and styrene in a ratio of 50:50 by weight was added 1 millimole of n-butyl lithium as an active lithium in a nitrogen atmosphere, and polymerization was conducted at 60° C. for 4 hours. After almost all the monomers were copolymerized, a 15 wt.% n-hexane solution containing 59 g of a monomer mixture of 1,3-butadiene and styrene in a ratio of 65:35 by weight was added to the resulting solution of active copolymers, and polymerization was conducted at 70° C. for 2 hours, and further at 85° C. for one hour. After almost all the additional monomers were copolymerized, 1 g of 2,6-di-tert-butyl-p-cresol was added thereto as a stabilizer, and the n-hexane solvent was removed therefrom by drying, whereby 100 g of ultimate block copolymer was obtained. The copolymer thus obtained was thermoplastic elastomer consisting of 1,3-butadiene and styrene containing 40% by weight of styrene and had a molecular weight of about 100,000. To 100 parts by weight of a toluene solution of said block copolymer (polymer concentration: 10% by weight) was added 100 parts by weight of an aqueous sodium rosinate solution containing 5 parts by weight of sodium rosinate per 100 parts by weight of the block copolymer, and the resulting mixture was emulsified in a dispermill. The resulting emulsified solution was immediately charged into a toluene-removing vessel provided with a heating jacket, and toluene was evaporated off by heating. At that time, a portion of water was evaporated together with toluene, and a dilute latex having a concentration of solid matters of 13.5% by weight was obtained. The dilute latex was continuously charged into a cylindrical centrifugal separator, and a concentrated latex having a concentration of total solid matters of 55% by weight was obtained at about 12,000 rpm. To 100 parts by weight of total solid matters of said concentrated latex (this means and also will mean hereinafter that to the concentrated latex thus obtained was added another latex in a ratio of amounts based upon 100 parts by weight of total solid matters in the concentrated latex) were added various amounts of natural rubber latex (total solid matters: 59% by weight) ranging from 20 to 80 parts by weight in terms of solid matters, and homogeneous dispersions were prepared by simple stirring with a stirrer rod. The latex compositions thus obtained were subjected to determination of MFT by a temperature gradient plate method proposed by Protzman, and further to the determination of tensile characteristics of film by preparing films from the latex compositions at 80° C. The results are shown in Table 1 in comparison with the case of concentrated latex of block copolymer, alone.

Table 1

| Item | | Amount of natural rubber latex added in terms of solid matters, parts by weight | | | | |
|---|---|---|---|---|---|---|
| | | 0 | 20 | 40 | 60 | 80 |
| Tensile characteristics | MFT (°C.) | 68.0 | 15.0 | 14.8 | 14.8 | 14.6 |
| | 300% modulus (kg/cm²) | 31 | 29 | 26 | 23 | 19 |
| | Tensile strength (kg/cm²) | 238 | 210 | 195 | 180 | 162 |
| | Elongation (%) | 890 | 880 | 850 | 840 | 790 |

EXAMPLE 2

A concentrated latex (total solid matters: 57% by weight) was prepared in the same manner as in Example 1, except that the emulsification was carried out in the presence of 3 parts by weight of polyoxyethylene nonylphenyl ether (mean degree of polymerization of oxyethylene of 15) per 100 parts by weight of the block copolymer in addition to sodium rosinate as the emulsifying agent of Example 1. To 100 parts by weight of total solid matters of the concentrated latex were added various amounts of carboxylated styrene-butadiene copolymer latex (made by Asahi Dow K.K., Japan, Dowlatex DL 620, total solid matters: 50% by weight), ranging from 20 to 80 parts by weight in terms of the solid matters, and homogeneous dispersions were prepared therefrom by simple stirring, and subjected to the same determinations as in Example 1. The results are shown in Table 2.

Table 2

| Item | | Amounts of carboxylated styrene-butadiene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.6 | 15.3 | 15.2 | 14.6 | 14.6 |
| | 300% modulus (kg/cm²) | 30 | 33 | 38 | 47 | 53 |
| | Tensile strength (kg/cm²) | 235 | 230 | 228 | 203 | 198 |
| | Elongation (%) | 900 | 860 | 810 | 780 | 720 |

EXAMPLE 3

Rosin acid was added to the toluene solution of the block copolymer of Example 1 so that 5 parts by weight of rosin acid might be dissolved per 100 parts by weight of the block copolymer, and the resulting solution was mixed with an aqueous solution containing an equimolar amount of sodium hydroxide to that of rosin acid in a ratio of 1:1 by weight. A concentrated latex having a concentration of total solid matters of 54% by weight was obtained by emulsification in the same manner as in Example 1. To 100 parts by weight of total solid matters of the concentrated latex were added various amounts of styrene-butadiene copolymer latex (made by Asahi Dow K.K., Japan, Dowlatex DL 612, total solid matters: 48% by weight), ranging from 20 to 80 parts by weight in terms of solid matters, and homogeneous dispersions were prepared by simple stirring, and subjected to the same determinations as in Example 1. The results are shown in Table 3.

Table 3

| Item | | Amounts of styrene-butadiene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.4 | 15.3 | 15.2 | 14.8 | 14.8 |
| | 300% modulus (kg/cm²) | 30 | 29 | 28 | 26 | 26 |
| | Tensile strength (kg/cm² | 230 | 221 | 208 | 196 | 189 |
| | Elongation (%) | 890 | 880 | 840 | 820 | 810 |

EXAMPLE 4

A concentrated latex (total solid matters: 55% by weight) was prepared by emulsification in the same manner as in Example 1, except that the same amount of disproportionated potassium rosinate was used in place of sodium rosinate of Example 1. To 100 parts by weight of total solid matters of the concentrated latex were added various amounts of carboxylated methyl methacrylate-butadiene copolymer latex (made by Takeda Yakuhin Kogyo K.K., Japan, Croslene 2M-34, total solid matters: 48% by weight), ranging from 20 to 80 parts by weight in terms of solid matters. Homogeneous dispersions were prepared therefrom by simple stirring, and subjected to the same determinations as in Example 1. The results are shown in Table 4.

Table 4

| Item | | Amounts of carboxylated methyl methacrylate-butadiene copolymer added, in terms of solid matters, parts by weight | | | | |
|---|---|---|---|---|---|---|
| | | 0 | 20 | 40 | 60 | 80 |
| | MFT (°C.) | 68.0 | 14.8 | 14.8 | 14.6 | 14.4 |
| Tensile character-istics | 300% modulus (kg/cm$^2$) | 31 | 32 | 31 | 32 | 34 |
| | Tensile strength (kg/cm$^2$) | 239 | 232 | 235 | 230 | 229 |
| | Elongation (%) | 900 | 890 | 870 | 850 | 810 |

EXAMPLE 5

A concentrated latex (solid matters: 53% by weiht) was prepared in the same manner as in Example 1, except that cyclohexane was used in place of toluene for dissolving the block copolymer of Example 1. To 100 parts by weight of total solid matters of the concentrated latex were added various amounts of styrene-butadiene-vinylpyridine copolymer latex (made by Japan Synthetic Rubber Co., Ltd., Japan, JSR 0650, total solid matters: 40% by weight), ranging from 20 to 80 parts by weight in terms of solid matters. Homogeneous dispersions were prepared by simple stirring, and subjected to the same determinations as in Example 1. The results are shown in Table 5.

Table 5

| Item | | Amounts of styrene-butadiene-vinylpyridine copolymer latex added, in terms of solid matters, parts by weight | | | | |
|---|---|---|---|---|---|---|
| | | 0 | 20 | 40 | 60 | 80 |
| | MFT (°C.) | 68.0 | 15.8 | 15.6 | 14.6 | 14.2 |
| Tensile character-istics | 300% modulus (kg/cm$^2$) | 30 | 28 | 27 | 25 | 22 |
| | Tensile strength (kg/cm$^2$) | 230 | 209 | 199 | 196 | 188 |
| | Elongation (%) | 910 | 900 | 880 | 890 | 860 |

EXAMPLE 6

A concentrated latex (total solid matters: 57% by weight) was prepared in the same manner as in Example 1, except that a benzene solution containing 20% by weight of the block copolymer was used in place of the toluene solution containing 10% by weight of the block copolymer of Example 1. To 100 parts by weight of total solid matters of the concentrated latex were added various amounts of chloroprene polymer latex (made by Showa Neoprene K.K., Japan, Neprene latex 571, total solid matters: 50% by weight), ranging from 20 to 80 parts by weight in terms of solid matters. Homogeneous dispersions were prepared therefrom by simple stirring, and subjected to the same determinations as in Example 1. The results are given in Table 6.

Table 6

| Item | | Amounts of chloroprene polymer latex added, in terms of solid matters, parts by weight | | | | |
|---|---|---|---|---|---|---|
| | | 0 | 20 | 40 | 60 | 80 |
| | MFT (°C.) | 69.0 | 16.0 | 15.6 | 15.2 | 15.0 |
| Tensile character-istics | 300% modulus (kg/cm$^2$) | 31 | 30 | 29 | 29 | 30 |
| | Tensile strength (kg/cm$^2$) | 240 | 220 | 208 | 199 | 196 |
| | Elongation (%) | 890 | 900 | 900 | 890 | 880 |

EXAMPLE 7

A concentrated latex (total solid matters: 58% by weight) was prepared in the same manner as in Example 1, except that the emulsification was carried out in the presence of 3 parts by weight of polyoxypropylene palmityl ether (mean degree of polymerization of polyoxypropylene: 10) per 100 parts by weight of the block copolymer in addition to the disproportionated potassium rosinate as the emulsifying agent of Example 4. To 100 parts by weight of total solid matters of the concentrated latex were added various amounts of isoprene-isobutylene copolymer latex (made by Esso Chemical K.K., Japan, Butyl latex 100, total solid matters: 61% by weight), ranging from 20 to 80 parts by weight in terms of solid matters. Homogeneous dispersions were prepared therefrom by simple stirring, and subjected to the same determinations as in Example 1. The results are given in Table 7.

Table 7

| Item | | Amounts of isoprene-isobutylene copolymer latex added, in terms of solid matters, parts by weight | | | | |
|---|---|---|---|---|---|---|
| | | 0 | 20 | 40 | 60 | 80 |
| | MFT (°C.) | 68.4 | 21.4 | 16.4 | 16.0 | 15.2 |
| Tensile character-istics | 300% modulus (kg/cm$^2$) | 30 | 28 | 26 | 22 | 21 |
| | Tensile strength (kg/cm$^2$) | 240 | 200 | 188 | 150 | 134 |
| | Elongation (%) | 900 | 920 | 940 | 960 | 1,000 |

EXAMPLE 8

To 100 parts by weight of total solid matters of the block copolymer latex (total solid matters: 55% by weight) obtained in Example 1 were added various amounts of acrylic acid ester polymer latex (made by Sumitomo Chemical Co., Ltd., Japan, Sumitex Resin AMH-1000, total solid matters: 40% by weight), ranging from 20 to 80 parts by weight in terms of solid matters. Homogeneous dispersions were prepared therefrom by simple stirring, and subjected to the same determinations as in Example 1. The results are given in Table 8.

Table 8

| Item | | Amounts of acrylic acid ester polymer latex added, in terms of solid matters, parts by weight | | | | |
|---|---|---|---|---|---|---|
| | | 0 | 20 | 40 | 60 | 80 |
| | MFT (°C.) | 66.8 | 51.2 | 14.8 | 14.6 | 14.6 |

Table 8-continued

| Item | | Amounts of acrylic acid ester polymer latex added, in terms of solid matters, parts by weight | | | | |
|---|---|---|---|---|---|---|
| | | 0 | 20 | 40 | 60 | 80 |
| Tensile characteristics | 300% modulus (kg/cm$^2$) | 28 | 36 | 48 | 53 | 68 |
| | Tensile strength (kg/cm$^2$) | 243 | 222 | 190 | 173 | 162 |
| | Elongation (%) | 900 | 820 | 750 | 640 | 580 |

EXAMPLE 9

To 100 parts by weight of total solid matters of the block copolymer latex (total solid matters: 55% by weight) obtained in Example 4 were added various amounts of acrylic acid ester polymer latex (made by Dainippon Ink Kagakukogyo K.K., Japan, voncoat R-3350, total solid matters: 45% by weight), ranging from 20 to 80 parts by weight in terms of solid matters. Homogeneous dispersions were prepared therefrom by simple stirring, and subjected to the same determinations as in Example 1. The results are shown in Table 9.

Table 9

| Item | | Amounts of acrylic acid ester polymer latex, in terms of solid matters, parts by weight | | | | |
|---|---|---|---|---|---|---|
| | | 0 | 20 | 40 | 60 | 80 |
| | MFT (°C.) | 66.8 | 14.0 | 14.0 | 13.8 | 13.6 |
| Tensile characteristics | 300% modulus (kg/cm$^2$) | 30 | 27 | 25 | 22 | 20 |
| | Tensile strength (kg/cm$^2$) | 243 | 212 | 190 | 172 | 156 |
| | Elongation (%) | 900 | 900 | 890 | 890 | 900 |

EXAMPLE 10

To 100 parts by weight of total solid matters of the block copolymer latex (total solid matters: 53% by weight) obtained in Example 5 were added various amounts of styrene-acrylic acid ester copolymer latex (made by Asahi Kasei Kogyo K.K., Polytron A-45, total solid matters: 55% by weight), ranging from 20 to 80 parts by weight in terms of solid matters. Homogeneous dispersions were prepared therefrom by simple stirring, and subjected to the same determinations as in Example 1. The results are shown in Table 10.

Table 10

| Item | | Amounts of styrene-acrylic acid ester copolymer latex added, in terms of solid matters, parts by weight | | | | |
|---|---|---|---|---|---|---|
| | | 0 | 20 | 40 | 60 | 80 |
| | MFT (°C.) | 66.6 | 21.0 | 15.8 | 15.2 | 14.6 |
| Tensile characteristics | 300% modulus (kg/cm$^2$) | 30 | 30 | 34 | 37 | 40 |
| | Tensile strength (kg/cm$^2$) | 240 | 222 | 199 | 180 | 175 |
| | Elongation (%) | 880 | 870 | 850 | 820 | 800 |

EXAMPLE 11

To a 15 wt.% toluene solution containing 30 g of styrene was added 0.126 moles of n-butyl-lithium as an active lithium compound in a nitrogen atmosphere, and polymerization was conducted at 50° C. for 5 hours. After more than 99% of the added styrene was polymerized, a 10 wt.% toluene solution containing 70 g of 1,3-butadiene was added thereto, and polymerization was conducted at 50° C. for 7 hours. After more than 99% of the added 1,3-butadiene was polymerized, coupling reaction was carried out by adding 0.032 moles of silicon tetrachloride without losing the activity. The resulting polymer was block copolymer of type (A - B)$_4$Si having branched chains, and after 1 g of 2,6-di-tert-butyl-p-cresol was added to the resulting solution of block copolymer as a stabilizer, the copolymer was deposited in methanol. The copolymer was thermoplastic elastomer consisting of 1,3-butadiene and styrene containing 30% by weight of styrene, and had a molecular weight of about 140,000. Disproportionated rosin acid was dissolved in a toluene solution of the block copolymer having branched chains (polymer concentration: 25% by weight) so that 5 parts by weight of the disproportionated rosin acid might be dissolved per 100 parts by weight of the block copolymer with branched chains, and the resulting solution was mixed with an aqueous solution containing an equimolar amount of sodium hydroxide to that of the disproportionated rosin acid in a mixing ratio of 1:1 by weight. Emulsification was carried out in the same manner as in Example 1, whereby a concentrated latex containing 54% by weight of total solid matters was prepared. To 100 parts by weight of total solid matters of the concentrated latex were added various amounts of acrylic acid ester polymer latex (made by Dainippon Ink Kagakukogyo K.K., Japan, Voncoat R-3350, total solid matters: 45% by weight), ranging from 20 to 80 parts by weight in terms of solid matters. Homogeneous dispersions were prepared therefrom by simple stirring, and subjected to the same determinations as in Example 1. The results are shown in Table 11.

Table 11

| Item | | Amounts of acrylic acid ester polymer added, in terms of solid matters, parts by weight | | | | |
|---|---|---|---|---|---|---|
| | | 0 | 20 | 40 | 60 | 80 |
| | MFT (°C.) | 67.4 | 15.2 | 14.8 | 14.4 | 14.0 |
| Tensile characteristics | 300% modulus (kg/cm$^2$) | 27 | 25 | 22 | 20 | 18 |
| | Tensile strength (kg/cm$^2$) | 290 | 268 | 244 | 222 | 198 |
| | Elongation (%) | 890 | 900 | 900 | 890 | 900 |

EXAMPLE 12

A concentrated latex (total solid matters: 56% by weight) was prepared in the same manner as in Example 1, except that block copolymer of type A-B-A consisting of styrene and 1,3-butadiene (made by Shell Chemical Company, U.S.A., Kraton 101, amount of bonded styrene: 28%, molecular weight: 76,000) was used in place of the block copolymer consisting of styrene and 1,3-butadiene prepared in Example 1. To 100 parts by weight of total solid matters of the concentrated latex were added various amounts of acrylic acid ester polymer latex (made by Dainippon Ink Kagakukogyo K.K., Japan, Voncoat R-3350, total solid matters: 45% by weight), ranging from 20 to 80 parts by weight in terms of solid matters. Homogeneous dispersions were prepared therefrom by simple stirring, and subjected to the same determinations as in Example 1. The results are shown in Table 12.

Table 12

| Item | | Amounts of acrylic acid ester polymer latex added, in terms of solid matters, parts by weight | | | | |
|---|---|---|---|---|---|---|
| | | 0 | 20 | 40 | 60 | 80 |
| | MFT (°C.) | 68.2 | 15.4 | 15.0 | 14.4 | 14.2 |
| Tensile characteristics | 300% modulus (kg/cm$^2$) | 31 | 28 | 28 | 24 | 22 |
| | Tensile strength (kg/cm$^2$) | 292 | 276 | 250 | 238 | 200 |
| | Elongation (%) | 920 | 900 | 900 | 910 | 900 |

EXAMPLE 13

To 100 parts by weight of total solid matters of the block copolymer latex (total solid matters: 55% by weight) obtained in Example 1 were added various amounts of vinyl acetate polymer latex (made by Hoechst Gosei K.K., Japan, Movinyl 50M, total solid matters: 50% by weight), ranging from 20 to 80 parts by weight in terms of solid matters. Homogeneous dispersions were prepared therefrom by simple stirring, and subjected to the same determinations as in Example 1. The results are given in Table 13.

Table 13

| Item | | Amounts of vinyl acetate polymer latex added, in terms of solid matters, parts by weight | | | | |
|---|---|---|---|---|---|---|
| | | 0 | 20 | 40 | 60 | 80 |
| | MFT (°C.) | 66.8 | 21.0 | 20.2 | 19.6 | 19.4 |
| Tensile characteristics | 300% modulus (kg/cm$^2$) | 30 | 38 | 4 | 56 | 67 |
| | Tensile strength (kg/cm$^2$) | 243 | 220 | 196 | 170 | 156 |
| | Elongation (%) | 900 | 820 | 770 | 660 | 600 |

EXAMPLE 14

To 100 parts by weight of total solid matters of the block copolymer latex (total solid matters: 55% by weight) obtained in Example 4 were added various amounts of vinyl acetate-ethylene copolymer latex (made by Dainippon Ink Kagakukogyo K.K., Japan, Evadic EP-11, total solid matters: 54% by weight) ranging from 20 to 80 parts by weight in terms of solid matters. Homogeneous dispersions were prepared by simple stirring, and subjected to the same determinations as in Example 1. The results are given in Table 14.

Table 14

| Item | | Amounts of vinyl acetate-ethylene copolymer latex added, in terms of solid matters, parts by weight | | | | |
|---|---|---|---|---|---|---|
| | | 0 | 20 | 40 | 60 | 80 |
| | MFT (°C.) | 66.8 | 22.0 | 15.8 | 15.0 | 14.6 |
| Tensile characteristics | 300% modulus (kg/cm$^2$) | 30 | 31 | 30 | 31 | 33 |
| | Tensile strength (kg/cm$^2$) | 243 | 228 | 202 | 190 | 185 |
| | Elongation (%) | 900 | 870 | 860 | 830 | 800 |

EXAMPLE 15

To 100 parts by weight of total solid matters of the block copolymer latex (total solid matters: 53% by weight) obtained in Example 5 were added various amounts of vinyl acetate-maleic acid ester copolymer latex (made by Hoechst Gosei K.K., Japan, Movinyl DM2H, total solid matters: 51% by weight) ranging from 20 to 80 parts by weight in terms of solid matters. Homogeneous dispersions were prepared therefrom by simple stirring, and subjected to the same determinations as in Example 1. The results are given in Table 15.

Table 15

| Item | | Amounts of vinyl acetate-maleic acid ester copolymer latex added, in terms of solid matters, parts by weight | | | | |
|---|---|---|---|---|---|---|
| | | 0 | 20 | 40 | 60 | 80 |
| | MFT (°C.) | 66.6 | 14.8 | 14.3 | 14.0 | 14.0 |
| Tensile characteristics | 300% modulus (kg/cm$^2$) | 30 | 32 | 34 | 35 | 37 |
| | Tensile strength (kg/cm$^2$) | 240 | 232 | 210 | 202 | 190 |
| | Elongation (%) | 880 | 860 | 830 | 800 | 780 |

EXAMPLE 16

To 100 parts by weight of total solid matters of the block copolymer latex having branched chains (total solid matters: 54% by weight) obtained in Example 11 were added various amounts of vinyl acetate-ethylene copolymer latex (made by Sumitomo Chemical Co., Ltd., Japan, Sumikaflex 751, total solid matters: 50% by weight) ranging from 20 to 80 parts by weight in terms of solid matters. Homogeneous dispersions were prepared therefrom by simple stirring, and subjected to the same determinations as in Example 1. The results are given in Table 16.

Table 16

| Item | | Amounts of vinyl acetate-ethylene copolymer latex added, in terms of solid matters, parts by weight | | | | |
|---|---|---|---|---|---|---|
| | | 0 | 20 | 40 | 60 | 80 |
| | MFT (°C.) | 67.4 | 15.8 | 15.4 | 14.8 | 14.2 |
| Tensile characteristics | 300% modulus (kg/cm$^2$) | 27 | 26 | 22 | 20 | 20 |
| | Tensile strength (kg/cm$^2$) | 288 | 258 | 230 | 199 | 168 |
| | Elongation (%) | 890 | 900 | 900 | 900 | 920 |

EXAMPLE 17

A concentrated latex (total solid matters: 55% by weight) was prepared by emulsification in the same manner as in Example 1, except that the same amount of sodium dodecylbenzene sulfonate was used in place of sodium rosinate of Example 1. To 100 parts by weight of total solid matters of the concentrated latex were added various amounts of carboxylated styrene-butadiene copolymer latex (made by Asahi Dow K.K., Japan, Dowlatex DL 620, total solid matters of 50% by weight) ranging from 20 to 80 parts by weight in terms of solid matters. Homogeneous dispersions were prepared therefrom by simple stirring and subjected to the same determinations as in Example 1. The results are given in Table 17.

Table 17

| Item | | Amounts of carboxylated styrene-butadiene copolymer latex added, in terms of solid matters, parts by weight | | | | |
|---|---|---|---|---|---|---|
| | | 0 | 20 | 40 | 60 | 80 |
| Tensile characteristics | MFT (°C.) | 67.9 | 15.2 | 15.0 | 14.7 | 14.4 |
| | 300% modulus (kg/cm$^2$) | 30 | 33 | 37 | 44 | 50 |
| | Tensile strength (kg/cm$^2$) | 240 | 233 | 230 | 221 | 212 |
| | Elongation (%) | 910 | 880 | 800 | 780 | 740 |

EXAMPLE 18

A concentrated latex (total solid matters: 56% by weight) was likewise prepared in the same manner as in Example 1, except that the emulsification was carried out in the presence of 2 parts by weight of polyoxyethylene nonylphenyl ether (mean degree of polymerization of oxyethylene: 15) per 100 parts by weight of the block copolymer in addition to sodium dodecylbenzene sulfonate as the emulsifying agent of Example 17. To 100 parts by weight of total solid matters of the concentrated latex were added various amounts of styrene-butadiene copolymer latex (made by Asahi Dow K.K., Japan, Dowlatex DL 612, total solid matters of 48% by weight), ranging from 20 to 80 parts by weight in terms of solid matters. Homogeneous dispersions were prepared therefrom by simple stirring, and subjected to the same determinations as in Example 1. The results are given in Table 18.

Table 18

| Item | | Amounts of styrene-butadiene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.0 | 15.3 | 15.0 | 14.8 | 14.7 |
| | 300% modulus (kg/cm$^2$) | 30 | 29 | 28 | 27 | 25 |
| | Tensile strength (kg/cm$^2$) | 238 | 229 | 220 | 202 | 195 |
| | Elongation (%) | 900 | 890 | 860 | 840 | 830 |

EXAMPLE 19

A concentrated latex (total solid matters: 53% by weight) was likewise prepared by emulsification in the same manner as in Example 1, except that the same amount of polyoxyethylene nonylphenyl ether (mean degree of polymerization of oxyethylene: 15) was used in place of sodium rosinate of Example 1. To 100 parts by weight of total solid matters of the concentrated latex were added various amounts of carboxylated methyl methacrylate-butadiene copolymer latex (made by Takeda Yakuhin Kogyo K.K., Japan, Croslene 2M-34, total solid matters of 48% by weight) ranging from 20 to 80 parts by weight in terms of solid matters. Homogeneous dispersions were prepared therefrom by simple stirring, and subjected to the same determinations as in Example 1. The results are given in Table 19.

Table 19

| Item | | Amounts of carboxylated methyl methacrylate-butadiene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.2 | 14.8 | 14.8 | 14.7 | 14.5 |
| | 300% modulus (kg/cm$^2$) | 31 | 32 | 32 | 33 | 34 |
| | Tensile strength (kg/cm$^2$) | 240 | 233 | 235 | 228 | 225 |
| | Elongation (%) | 900 | 890 | 870 | 850 | 820 |

EXAMPLE 20

A concentrated latex (total solid matters: 58% by weight) was likewise prepared by emulsification in the same manner as in Example 1, except that the same amount of polyoxypropylene decylphenyl ether (mean degree of polymerization of oxypropylene: 15) was used in place of sodium rosinate of Example 1. To 100 parts by weight of total solid matters of the concentrated latex were added various amounts of isoprene-isobutylene copolymer latex (made by Esso Kagaku K.K., Japan, Butyl latex 100, total solid matters of 61% by weight) ranging from 20 to 80 parts by weight in terms of solid matters. Homogeneous dispersions were prepared by simple stirring, and subjected to the same determinations as in Example 1. The results are given in Table 20.

Table 20

| Item | | Amounts of isoprene-isobutylene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.6 | 21.2 | 16.8 | 15.6 | 15.0 |
| | 300% modulus (kg/cm$^2$) | 30 | 28 | 26 | 23 | 22 |
| | Tensile strength (kg/cm$^2$) | 244 | 200 | 186 | 154 | 130 |
| | Elongation (%) | 920 | 920 | 930 | 960 | 990 |

EXAMPLE 21

A concentrated latex (total solid content: 54% by weight) was likewise prepared in the same manner as in Example 17, except that cyclohexane was used in place of toluene as the solvent of Example 17. To 100 parts by weight of total solid matters of the concentrated latex were added various amounts of acrylic acid ester polymer latex (made by Dainippon Ink Kagakukogyo K.K., Japan, Voncoat R-3350, total solid matters of 45% by weight) ranging from 20 to 80 parts by weight in terms of solid matters. Homogeneous dispersions were prepared therefrom by simple stirring, and subjected to the same determinations as in Example 1. The results are given in Table 21.

Table 21

| Item | | Amounts of acrylic acid ester polymer latex added, in terms of solid matters, parts by weight | | | | |
|---|---|---|---|---|---|---|
| | | 0 | 20 | 40 | 60 | 80 |
| Tensile characteristics | MFT (°C.) | 68.0 | 14.8 | 14.7 | 14.3 | 14.0 |
| | 300% modulus (kg/cm$^2$) | 30 | 28 | 25 | 23 | 21 |
| | Tensile strength (kg/cm$^2$) | 242 | 220 | 200 | 182 | 163 |
| | Elongation (%) | 910 | 900 | 900 | 910 | 900 |

EXAMPLE 22

A concentrated latex (total solid matters: 57% by weight) was likewise prepared in the same manner as in Example 1, except that the block copolymer with branched chains consisting of styrene and 1,3-butadiene prepared in Example 11 was used in place of the block copolymer consisting of styrene and 1,3-butadiene prepared in Example 1, and further the same amount of polyoxypropylene palmityl ether (mean degree of polyoxypropylene of 10) was used in place of sodium rosinate as the emulsifying agent. To 100 parts by weight of total solid matters of the concentrated latex were added various amounts of styrene-acrylic acid ester copolymer latex (made by Asahi Kasei Kogyo K.K., Japan, Polytron A-45, total solid matters of 55% by weight), ranging from 20 to 80 parts by weight in terms of solid matters. Homogeneous dispersions were prepared therefrom by simple stirring, and subjected to the same determinations as in Example 1. The results are given in Table 22.

Table 22

| Item | | Amounts of styrene-acrylic acid ester copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.2 | 21.4 | 16.4 | 15.8 | 15.2 |
| | 300% modulus kg/cm$^2$) | 28 | 30 | 30 | 36 | 37 |
| | Tensile strength (kg/cm$^2$) | 296 | 272 | 249 | 222 | 213 |
| | Elongation (%) | 900 | 880 | 840 | 840 | 820 |

EXAMPLE 23

To 100 parts by weight of total solid matters of the concentrated latex (total solid matters: 55% by weight) prepared in Example 17 were added various amounts of vinyl acetate polymer latex (made by Hoechst Gosei K.K., Japan, Movinyl 50M, total solid matters: 50% by weight) ranging from 20 to 80 parts by weight in terms of solid matters. Homogeneous dispersions were prepared therefrom, and subjected to the same determinations as in Example 1. The results are given in Table 23.

Table 23

| Item | | Amounts of vinyl acetate polymer latex added, in terms of solid matters, parts by weight | | | | |
|---|---|---|---|---|---|---|
| | | 0 | 20 | 40 | 60 | 80 |
| Tensile characteristics | MFT (°C.) | 67.9 | 22.0 | 21.6 | 20.4 | 19.8 |
| | 300% modulus (kg/cm$^2$) | 30 | 37 | 46 | 53 | 66 |
| | Tensile strength (kg/cm$^2$) | 240 | 220 | 201 | 178 | 160 |
| | Elongation (%) | 910 | 830 | 790 | 700 | 620 |

EXAMPLE 24

A concentrated latex (total solid matters: 55% by weight) was likewise prepared in the same manner as in Example 1, except that block copolymers of type A-B-A consisting of styrene and 1,3-butadiene (made by Shell Chemical Company, U.S.A., Kraton 101, amount of bonded styrene of 28%, molecular weight of 76,000) were used in place of the block copolymer consisting of styrene and 1,3-butadiene prepared in Example 1, and further the same amount of polyoxyethylene nonylphenol phosphite (mean degree of polymerization of oxyethylene: 15) was used in place of sodium rosinate as the emulsifying agent. To 100 parts by weight of total solid matters of the concentrated latex were added various amounts of vinyl acetate-ethylene copolymer latex (made by Sumitomo Chemical Co., Ltd., Japan, Sumikaflex 751, total solid matters: 50% by weight) ranging from 20 to 80 parts by weight in terms of solid matters. Homogeneous dispersions were prepared by simple stirring, and subjected to the same determinations as in Example 1. The results are given in Table 24.

Table 24

| Item | | Amounts of vinyl acetate-ethylene copolymer latex added, in terms of solid matters, parts by weight | | | | |
|---|---|---|---|---|---|---|
| | | 0 | 20 | 40 | 60 | 80 |
| Tensile characteristics | MFT (°C.) | 68.2 | 14.8 | 14.4 | 13.8 | 13.6 |
| | 300% modulus (kg/cm$^2$) | 30 | 30 | 27 | 26 | 24 |
| | Tensile strength (kg/cm$^2$) | 288 | 260 | 252 | 228 | 210 |
| | Elongation (%) | 930 | 960 | 980 | 990 | 1,020 |

COMPARATIVE EXAMPLE 1

A concentrated latex (total solid matters: 53% by weight) was likewise prepared in the same manner as in Example 1, except that styrene polymer (made by Asahi Dow K.K., Japan, Styron 683) was used in place of the block copolymer consisting of styrene and 1,3-butadiene of Example 1. To 100 parts by weight of total solid matters of the concentrated latex were added various amounts of natural rubber latex (total solid matters of 59% by weight), carboxylated styrene-butadiene copolymer latex (made by Asahi Dow K.K., Japan, Dowlatex DL 620, total solid matters of 50% by weight), acrylic acid ester polymer latex (made by Dainippon Ink Kagakukogyo K.K., Japan, Voncoat R-3350, total solid matters: 45% by weight), and vinyl acetate polymer latex (made by Hoechst Gosei K.K., Japan, Movinyl 50 M, total solid matters: 50% by weight), each ranging from 20 to 80 parts by weight in terms of solid matters. Homogeneous dispersions were prepared by simple stirring, and subjected to determination of MFT in the same manner as in Example 1. No lowering in MFT was observed. The results are given in Tables 25 to 28.

Table 25

| Item | Amounts of natural rubber added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

Table 26

| Item | Amounts of carboxylated styrene-butadiene copolymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

Table 27

| Item | Amounts of acrylic acid ester polymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

Table 28

| Item | Amounts of vinyl acetate polymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

COMPARATIVE EXAMPLE 2

A concentrated latex polymer (total solid matters: 55% by weight) was likewise prepared in the same manner as in Example 18, except that styrene polymer (made by Asahi Dow K.K., Japan, Styron 683) was used in place of the block copolymer consisting of styrene and 1,3-butadiene of Example 18. To 100 parts by weight of total solid matters of the concentrated latex were added various amounts of carboxylated styrene-butadiene copolymer latex (made by Asahi Dow K.K., Japan, Dowlatex DL 620, total solid matters of 50% by weight), acrylic acid ester polymer latex (made by Dainippon Ink Kagakukogyo K.K., Japan, Voncoat R-3350, total solid matters of 45% by weight) and vinyl acetate-ethylene copolymer latex (made by Sumitomo Chemical Co., Ltd., Japan, Sumikaflex 751, total solid matters of 50% by weight), each ranging from 20 to 80 parts by weight in terms of solid matters. Homogeneous dispersions were prepared therefrom by simple stirring, and subjected to determination of MFT in the same manner as in Example 1. No lowering in MFT was observed. The results are shown in Table 29 to 31.

Table 29

| Item | Amounts of carboxylated styrene-butadiene copolymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

Table 30

| Item | Amounts of acrylic acid ester polymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

Table 31

| Item | Amounts of vinyl acetate-ethylene copolymer latex added, in terms of solid matters, parts by weight | | | | |
|---|---|---|---|---|---|
| | 0 | 20 | 40 | 60 | 80 |
| MFT (°C.) | 100 or more | 100 or more | 100 or more | 100 or more | 100 or more |

EXAMPLE 25

To a 15 wt.% hexane solution containing 33 g of a monomer mixture of 1,3-butadiene and styrene in a ratio of 40:60 by weight was added 1 millimole of n-butyl lithium as an active lithium, and polymerization was conducted at 60° C. for 4 hours. After almost all the monomers were copolymerized, a 15 wt.% n-hexane solution containing 67 g of a monomer mixture of 1,3-butadiene and styrene in a ratio of 70:30 by weight was added to the resulting active copolymer solution, and polymerization was conducted at 70° C. for 2 hours, and further at 85° C. for one hour. Then, 1 g of 2,6-di-tert-butyl-p-cresol was added thereto as a stabilizer, and the n-hexane solvent was removed therefrom by drying, whereby 100 g of ultimate block copolymer was obtained. The resulting copolymer was a thermoplastic elastomer consisting of 1,3-butadiene and styrene, and had a molecular weight of about 100,000. To 100 parts by weight of a toluene solution of the block copolymer (polymer concentration: 10% by weight) was added 100 parts by weight of an aqueous solution containing 5 parts by weight of sodium rosinate per 100 parts by weight of the block copolymer and 3 parts by weight of polyoxyethylene nonylphenyl ether (mean degree of polymerization of oxyethylene: 15) per 100 parts by weight of the block copolymer, and the resulting mixture was emulsified by a dispermill. The resulting emulsified solution was immediately charged into a toluene-removing vessel provided with a heating jacket, and toluene was evaporated off by heating. At that time, a portion of water was evaporated together with toluene, whereby a dilute latex having a concentration of solid matters of 13.5% by weight was obtained. Then, the latex was continuously charged in a cylindrical centrifugal separator, and a concentrated latex containing 55% by weight of total solid matters was obtained at about 12,000 rpm. The resulting block copolymer latex was mixed with styrene-butadiene copolymer latex (made by Asahi Dow K.K., Japan, Dowlatex DL 612, total solid matters of 48% by weight) in various mixing ratios, and homogeneous dispersions were prepared therefrom by simple stirring. Films were made from the dispersions at 80° C., and their tensile characteristics were measured. The results are given in Table 32 in comparison with the case of styrene-butadiene copolymer latex, alone.

Table 32

| Item | Amounts of block copolymer latex added, in terms of solid matters, % by weight | | | | |
|---|---|---|---|---|---|
| | 0 | 10 | 30 | 50 | 70 |
| Tensile strength (kg/cm²) | 37 | 80 | 135 | 180 | 205 |
| Elongation (%) | 530 | 620 | 730 | 810 | 840 |

EXAMPLE 26

A concentrated latex (total solid matters: 56% by weight) was prepared in the same manner as in Example 25, except that cyclohexane was used in place of toluene as the solvent of Example 25. The resulting block copolymer latex was mixed with carboxylated styrene-butadiene copolymer latex (made by Takeda Yakuhin Kogyo K.K., Japan, Croslene SA-22, total solid matters: 47% by weight) in various mixing ratio. Homogeneous dispersions were prepared therefrom by simple stirring and subjected to the same determinations as in Example 25. The results are shown in Table 33.

Table 33

| Item | Amounts of block copolymer latex added, in terms of solid matters, % by weight | | | | |
|---|---|---|---|---|---|
| | 0 | 10 | 30 | 50 | 70 |
| Tensile strength (kg/cm²) | 43 | 94 | 152 | 188 | 212 |
| Elongation (%) | 900 | 910 | 900 | 900 | 910 |

EXAMPLE 27

A concentrated latex total solid matters of 54% by weight) was likewise prepared in the same manner as in Example 25, except that 5 parts by weight of sodium dodecylbenzene sulfonate was used per 100 parts by weight of the block copolymer in place of the emulsifying agent of Example 25. The resulting block copolymer latex was mixed with acrylic acid ester polymer latex (made by Dainippon Ink Kagakukogyo K.K., Japan, Voncoat R-3350, total solid matters of 45% by weight) in various mixing ratio. Homogeneous dispersions were prepared therefrom by simple stirring and subjected to the same determinations as in Example 25. The results are shown in Table 34.

Table 34

| Item | Amounts of block copolymer latex added, in terms of solid matters, % by weight | | | | |
|---|---|---|---|---|---|
| | 0 | 10 | 30 | 50 | 70 |
| Tensile strength (kg/cm²) | 10 | 62 | 116 | 156 | 190 |
| Elongation (%) | 990 | 970 | 940 | 900 | 890 |

EXAMPLE 28

A concentrated latex (total solid matters: 58% by weight) was likewise prepared in the same manner as in Example 25, except that a 20 wt.% block copolymer solution in benzene was used in place of a 10 wt.% block copolymer solution in toluene of Example 25. The resulting block copolymer latex was mixed with styrene-acrylic acid ester copolymer latex (made by Asahi Kasei Kogyo K.K., Japan, Polytron A-45, total solid matters: 55% by weight) in various mixing ratios. Homogeneous dispersions were prepared therefrom by simple stirring, and subjected to the same determinations as in Example 25. The results are given in Table 35.

Table 35

| Item | Amounts of block copolymer latex added, in terms of solid matters, % by weight | | | | |
|---|---|---|---|---|---|
| | 0 | 10 | 30 | 50 | 70 |
| Tensile strength (kg/cm²) | 135 | 150 | 172 | 190 | 202 |
| Elongation (%) | 380 | 460 | 610 | 740 | 830 |

EXAMPLE 29

The block copolymer latex having branched chains prepared in Example 11 was mixed with vinyl acetate-ethylene copolymer latex (made by Dainippon Kagakukogyo K.K., Japan, Evadic EP-11, total solid matters: 54% by weight) in various mixing ratios. Homogeneous dispersions were prepared therefrom by simple stirring, and subjected to the same determinations as in Example 25. The results are given in Table 36.

Table 36

| Item | Amounts of block copolymer latex having branched chains added, in terms of solid matters, % by weight | | | | |
|---|---|---|---|---|---|
| | 0 | 10 | 30 | 50 | 70 |
| Tensile strength (kg/cm²) | 70 | 132 | 166 | 200 | 240 |
| Elongation (%) | 400 | 520 | 610 | 730 | 820 |

As shown in Examples 1 to 24, the latex composition consisting of block copolymer latex consisting of conjugated diolefin and monovinyl-substituted aromatic compound, and a latex of rubber system, latex of synthetic resin system or a mixture thereof has a very effectively improved film-forming property of the block copolymer latex without impairing the features of the block copolymer latex. Furthermore, as shown in Examples 25 to 29, the latex composition has a very effectively improved tensile characteristics of films of the latex of rubber system, latex of synthetic resin system or a mixture thereof.

What is claimed is:

1. A latex composition comprising 63–83% by weight (per solid matter) of (A) an aqueous latex of at least one block copolymer consisting of conjugated diolefin blocks and 10–70% by weight of monovinyl-substituted aromatic compound blocks and having a molecular weight of 5,000–500,000 prepared by solution polymerization, and 37–17% by weight (per solid matter) of (B) a rubber latex, a synthetic resin latex, a mixture of these latices or a latex in which the constitutional elements of the rubber or synthetic resin are modified with carboxyl or hydroxyl groups.

2. A latex composition of block copolymer according to claim 1 wherein said monovinyl-substituted aromatic compound is at least one member selected from the group consisting of styrene, o- or p- vinyltoluene, vinylxylene, ethylstyrene, isopropylstyrene, ethylvinyltoluene, tertiary-butylstyrene, diethylstyrene and vinylnaphthalene.

3. A latex composition of block copolymer according to claim 1 wherein said conjugated diolefin is at least one member selected from the group consisting of 1,3-butadiene, 1,3-pentadiene, isoprene and 2,3-dimethylbutadiene.

4. A latex composition of block copolymer according to claim 1 wherein said block copolymer consists of 1,3-butadiene blocks and styrene blocks.

5. A latex composition of block copolymer according to claim 1 wherein said block copolymer consists of isoprene blocks and styrene blocks.

6. A latex composition of block copolymer according to claim 1 wherein said rubber latex is at least one member selected from the group consisting of natural rubber latex, styrene-butadiene copolymer latex, methyl methacrylate-butadiene copolymer latex, acrylonitrile-butadiene copolymer latex, isoprene-isobutylene copolymer latex, styrene-butadiene-vinylpyridine copolymer latex, ethylene-propylene copolymer latex, ethylene-propylene-diene copolymer latex, chloroprene polymer latex, butadiene polymer latex and isoprene polymer latex.

7. A latex composition of block copolymer according to claim 1 wherein said synthetic resin type latex is at least one member selected from the group consisting of methyl acrylate polymer latex, ethyl acrylate polymer latex, butyl acrylate polymer latex, 2-ethylhexyl acrylate polymer latex, ethyl acrylate-butyl acrylate copolymer latex, butyl acrylate-2-ethylhexyl acrylate copolymer latex, acrylic acid ester-vinyl acetate copolymer latex, acrylic acid ester-styrene copolymer latex, acrylic acid ester-methyl methacrylate copolymer latex, vinyl acetate polymer latex, vinyl acetate-ethylene copolymer latex, vinyl acetate-ethylene-acrylic acid copolymer latex, vinyl acetate-acrylic acid copolymer latex, vinyl acetate-maleic anhydride copolymer latex, vinyl acetate-maleic acid ester copolymer latex, vinyl acetate-veova copolymer latex, vinyl acetate-vinyl chloride copolymer latex, vinyl acetate-vinyl chloride-acrylic acid copolymer latex, vinyl chloride polymer latex, vinylidene chloride polymer latex, vinyl chloride-vinylidene chloride copolymer latex, urethane polymer latex, polyamide latex and polyester latex.

* * * * *